(12) United States Patent
McCormick et al.

(10) Patent No.: US 8,129,690 B2
(45) Date of Patent: Mar. 6, 2012

(54) HIGH SENSITIVITY B-10 NEUTRON DETECTORS USING HIGH SURFACE AREA INSERTS

(75) Inventors: Dan Jay McCormick, Hudson, OH (US); James Michael Lustig, Mantua, OH (US)

(73) Assignee: General Electric Company, Schenectady, NY (US)

( * ) Notice: Subject to any disclaimer, the term of this patent is extended or adjusted under 35 U.S.C. 154(b) by 455 days.

(21) Appl. No.: 12/422,777

(22) Filed: Apr. 13, 2009

(65) Prior Publication Data
US 2010/0258737 A1    Oct. 14, 2010

(51) Int. Cl.
*G01T 3/00* (2006.01)
(52) U.S. Cl. ........... 250/390.01; 250/385.1; 250/370.05; 376/153; 376/155
(58) Field of Classification Search ............ 250/390.01, 250/385.1, 370.05; 376/153, 155
See application file for complete search history.

(56) References Cited

U.S. PATENT DOCUMENTS

| | | | |
|---|---|---|---|
| 3,860,845 A * | 1/1975 | Gleason et al. | 376/155 |
| 3,956,654 A * | 5/1976 | Gleason | 376/153 |
| 4,121,106 A * | 10/1978 | Terhune et al. | 376/154 |
| 4,359,661 A * | 11/1982 | Mitrofanov | 313/93 |
| 4,764,139 A * | 8/1988 | Murata et al. | 156/89.12 |
| 5,973,328 A * | 10/1999 | Hiller et al. | 250/390.01 |
| 6,011,262 A * | 1/2000 | Hamashima et al. | 250/310 |
| 6,426,504 B1 * | 7/2002 | Menlove et al. | 250/390.01 |
| 6,452,191 B1 * | 9/2002 | Johnson et al. | 250/385.1 |
| 6,455,987 B1 * | 9/2002 | Durst et al. | 313/103 R |
| 6,546,070 B1 * | 4/2003 | Francke | 378/51 |
| 7,372,040 B2 * | 5/2008 | Polichar et al. | 250/390.01 |
| 7,508,131 B2 * | 3/2009 | Downing et al. | 313/523 |
| 7,635,849 B2 * | 12/2009 | Klein et al. | 250/390.01 |
| 2003/0152186 A1 * | 8/2003 | Jurczyk et al. | 376/109 |
| 2005/0093410 A1 * | 5/2005 | White et al. | 313/103 CM |
| 2005/0205798 A1 * | 9/2005 | Downing et al. | 250/390.11 |
| 2009/0101831 A1 * | 4/2009 | Zhong et al. | 250/391 |

OTHER PUBLICATIONS

Bellinger, S.L., W.J. McNeil, D.S. McGregor,209, "Improved Fabrication Technique for Microstructured Solid-State Neutron Detectors," S.M.A.R.T. Laboratory, Mechanical and Nuclear Engineering Dept., Kansas State University, Manhattan, KS 66506.
McGregor, M.C., Hammig, M.D., Yang, Y.-H., Gersch, H.K., and Klann, R.T., 2003, "Design Considerations for Thin Film Coated Semiconductor Thermal Neutron Detectors—I: Basics Regarding Alpha Particle Emitting Neutron Reactive Films," Nucler Instruments & Methods in Physics Research A, 500, pp. 272-308.
McNeil, W.J., Bellinger, S.L., Unruh, T.C., Henderson, C.M., Ugorowski, P., et al. 2009, "1-D Array of Perforated Diode Neutron Detectors," Nuclear Instruments and Methods in Physics Research A, 604, pp. 127-129.
Shultis, J.K., and McGregor, D.S., 2009, "Design and Performance Considerations for Perforated Semiconductor Thermal-Neutron Detectors," Nuclear Instruments and Methods in Physics Research A, doi: 10.1016/j.nima.2009.02.033.
Unruh, T.C., Bellinger, S.L., Huddleston, D.E., McNeil, W.J., Patterson, E., et al., 2009, Design and Operation of a 2-D Thin Film Semiconductor Neutron Detector Array for Use as a Beamport Monitor, Nuclear Instrucments and Methods in Physics Research A, 604, pp. 150-153.

* cited by examiner

*Primary Examiner* — David Porta
*Assistant Examiner* — Djura Malevic
(74) *Attorney, Agent, or Firm* — Pearne & Gordon LLP

(57) ABSTRACT

A neutron detector that includes an anode and a cathode. The cathode includes at least one portion that has a porous substrate with surface segments that define open pores and a layer of neutron sensitive material on the surface segments of the porous substrate.

13 Claims, 4 Drawing Sheets

HIGH SENSITIVITY B-10 NEUTRON DETECTORS USING HIGH SURFACE AREA INSERTS

BACKGROUND OF THE INVENTION

1. Field of the Invention

The invention relates to neutron detectors, and specifically relates to detectors that have improved sensitivity.

2. Discussion of Prior Art

Recently, high sensitivity neutron detectors for homeland security have become increasingly important and increasingly in demand. Many known neutron detectors utilize He-3, a neutron sensitive material known to provide a detector of high sensitivity. The He-3 is provided within a volume that includes a cathode within a detection arrangement. Recently, the availability of He-3 has been has become insufficient to satisfy the demand associated with high sensitivity neutron detectors. Other than He-3 there are only a few neutron sensitive materials that are useful for constructing a neutron detector, including certain isotopes of uranium, lithium and boron.

Focusing for the moment upon the physical construction of neutron detectors and neutron detector arrangements, a neutron detector includes an anode and a cathode. One example detector includes a wire extending on an axis for the anode and a cylindrical cathode circumscribing the anode.

Focusing upon boron, the majority (e.g., approximately 80%) of available boron is B-11, which has 5 protons and 6 neutrons, and the remainder (e.g., approximately 20%) is Boron 10 (B-10), which has 5 protons and 5 neutrons. Only the B-10 isotope is useful for neutron detection. Thus, for use in a neutron detector, it is typically desirable to enrich the concentration of B-10.

As mentioned, the detection of neutrons is based on the generation of secondary radiations. With B-10 ($^{10}$B) as the converter material, the reaction is described as follows when a neutron is captured:

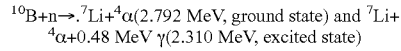

The energy released by the reaction is approximately 2.310 million electron volts (MeV) in 94% of all reactions (2.792 MeV in the remaining 6%), and equals the energy imparted to the two reaction products (the energy of the captured neutron is negligible by comparison). The reaction products, namely an alpha particle ($\alpha$) and a lithium nucleus ($^7$Li) are emitted isotropically from the point of neutron capture by B-10 in exactly opposite directions and, in the case of the dominant excited state, with kinetic energies of 1.47 MeV and 0.84 MeV, respectively.

Turning back to physical construction of neutron detector arrangements, a new generation of neutron detectors would be most beneficial if the new generation detectors provided a similar level of sensitivity as existing He-3 detectors without significant change to overall dimensions of the detectors. Another way of considering this idea is that the new generation of detectors must be physically similar to existing detectors so they can be easily retrofitted and must have comparable neutron sensitivity and gamma rejection as He-3.

As mentioned, the use of B-10 for neutron detection is known. However, the use of B-10 in known sensor configurations (i.e., plated onto the cathode structure of known sensors) is associated with insufficient sensitivity. Specifically, B-10 coating on the cathode structure is relatively thin and such detectors achieve only a few percent efficiency, due to the fact that the thicknesses needed for a substantial capture of neutrons exceeds the escape range of the neutron capture reaction products. In one example, the thickness of the B-10 coating is 0.4 mg/cm$^2$. So in many instances, capture reaction products cannot escape. Only conversions of neutrons in a very thin layer near the surface of the B-10 adjacent contained gas are detected efficiently. Since this very thin, top layer of the B-10 coating captures only a very small percentage of the incident neutrons, efficiency of a neutron detector of such simple design is understandably low.

A new generation of approaches to neutron detectors would be most beneficial if the new generation provided at least a similar level of neutron sensitivity and a discrimination of gamma rays without significant change to overall dimensions of the detectors. For a new generation that utilizes B-10 it would be most beneficial to work with an acknowledgement of the abilities of B-10.

BRIEF DESCRIPTION OF THE INVENTION

The following summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

One aspect of the invention provides a neutron detector that includes an anode and a cathode. The cathode includes at least one portion that has a porous substrate with surface segments that define open pores and a layer of neutron sensitive material on the surface segments of the porous substrate.

BRIEF DESCRIPTION OF THE DRAWINGS

The foregoing and other aspects of the invention will become apparent to those skilled in the art to which the invention relates upon reading the following description with reference to the accompanying drawings, in which.

DETAILED DESCRIPTION OF THE INVENTION

Figure 1:
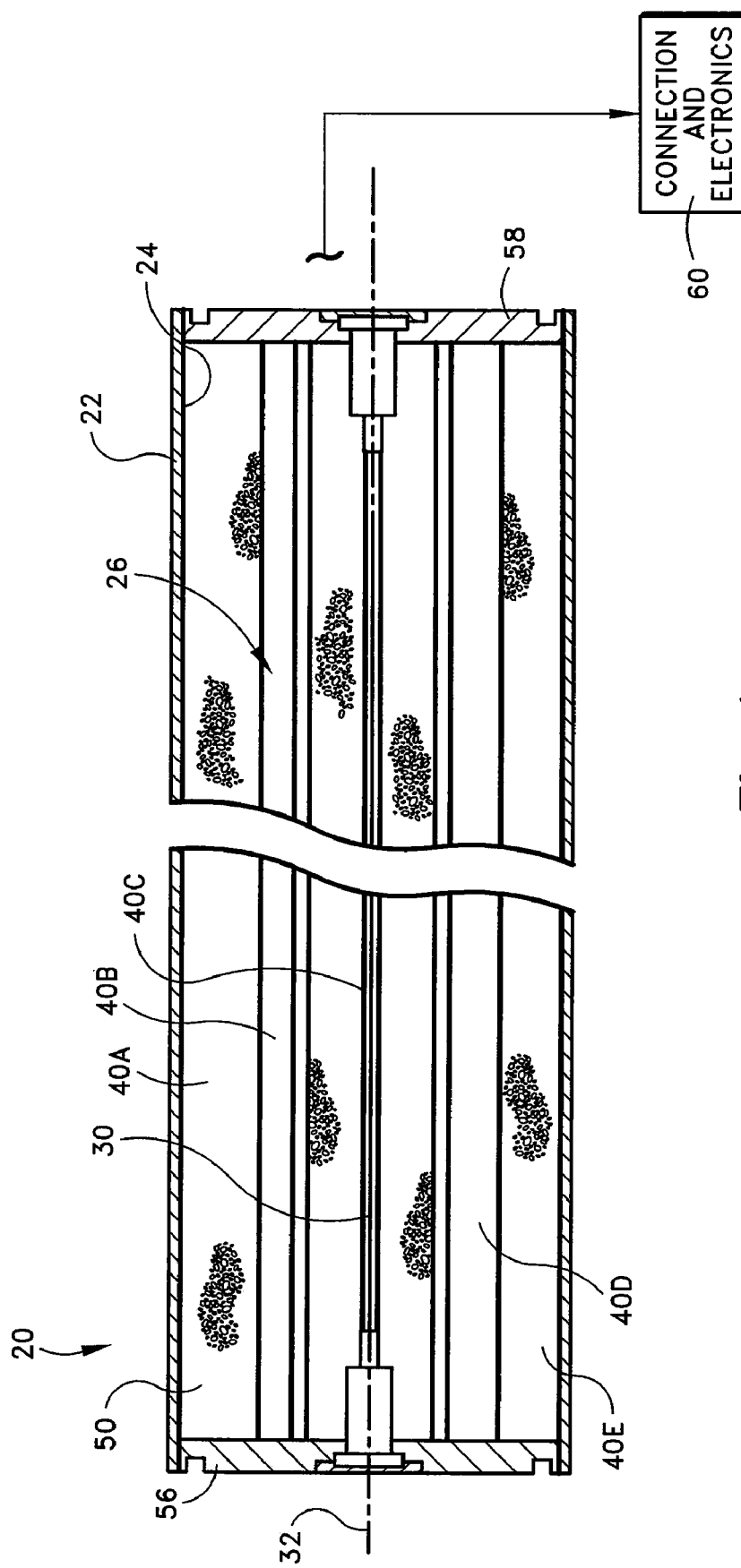
FIG. 1 is a schematic cross-section of an example neutron detector showing at least one fin of porous material in accordance with one aspect of the invention.

Example embodiments that incorporate one or more aspects of the invention are described and illustrated in the drawings. These illustrated examples are not intended to be a limitation on the invention. For example, one or more aspects of the invention can be utilized in other embodiments and even other types of devices. Moreover, certain terminology is used herein for convenience only and is not to be taken as a limitation on the invention. Still further, in the drawings, the same reference numerals are employed for designating the same elements.

Figure 2:
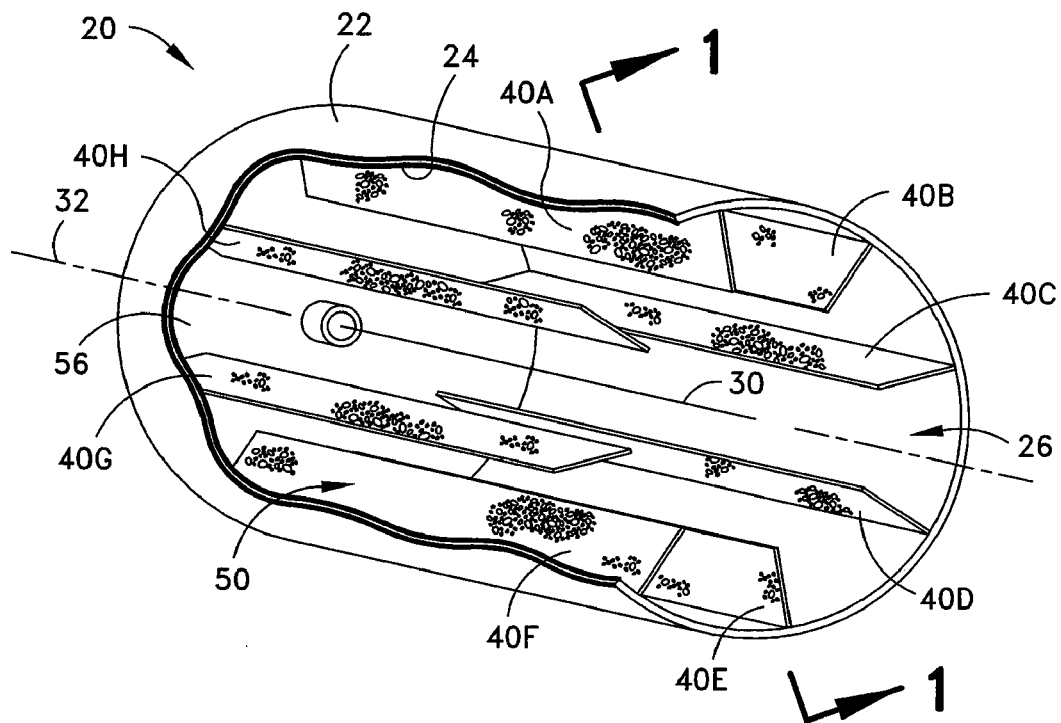
FIG. 2 is a perspective view of the example neutron detector of FIG. 1, which has been partially torn open to better show some structural aspects, with the orientation relationship between FIGS. 1 and 2 being indicated by line 1-1 in FIG. 2 to indicated the section location for FIG. 1.

An example embodiment of a neutron detector 20 that includes an aspect of the invention is shown in FIGS. 1 and 2. Basically, the neutron detector 20 includes a hollow member 22 that has an interior surface 24 bounding a volume 26. The volume 26 is sealed via two end plates 56, 58, and the sealed volume contains a gas such as argon and/or carbon-dioxide.

An anode electrode 30 is located within the volume 26. In the shown example, the anode 30 is elongate and extends along an axis 32 of the neutron detector 20. In one example, the anode 30 is a wire that is in the range of 0.0254-0.0508 mm (0.001-0.002 inches) in diameter. Such a size range is merely an example. Accordingly, such an example should not be considered to be a limitation upon the invention.

In the shown example, the hollow member 22 is cylindrical and extends around to circumscribe the anode 30 and the axis 32. Of course, the hollow member 22 may have a different shape, such as having a plurality (e.g., six or eight) rectangular wall segments that circumscribe the axis 32. As such, the cylindrical shape need not be a limitation. At least one fin (e.g., 40A) extends within the volume 26. The fin (e.g., 40A) is an addition (e.g. an insert) to the hollow member 22, which is logically otherwise hollow.

Figure 3:
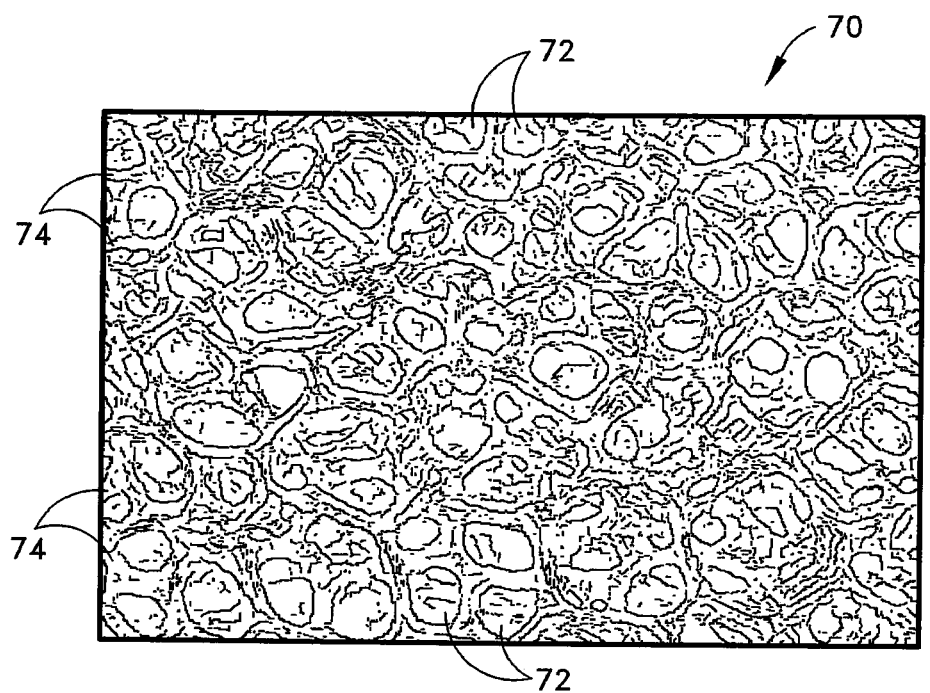
FIG. 3 is a magnified view of an example of porous material that may be utilized for an insert such as the at least one fin within the example of FIGS. 1 and 2.

In one example of FIGS. 1 and 2, there are eight fins 40A-40H, each added as an insert into the hollow member 22. Each fin (e.g., 40A) is made of a porous substrate material 70 (see the magnified example of FIG. 3). The porosity of the fins 40A-40H is shown in FIGS. 1 and 2 by partial shading on the fins. The shading is not used on the entirety of all of the fins 40A-40H so that the drawing figures may be visually cleaner. It is to be appreciated that the porosity may extend over the entirety of each fin (e.g., 40A).

The porous substrate material 70 (FIG. 3) for the fins 40A-40H (FIGS. 1 and 2) can be any suitable neutron detector cathode substrate material. In one example the porous substrate material 70 is metal. In one specific embodiment, the substrate material 70 may be referred to as metal foam. In another example the porous substrate material 70 is a dielectric material. In yet another example is conductive ceramic foam may be utilized. The foam may be metalized with a metallic blush. Such, metalizing may aid in reducing charge build-up in the detector.

The porous substrate material 70 has open pores 72 that extend throughout the material and the pores are defined by surface segments 74 of the substrate material. The pores are open to each other and as such the open pores interconnect with each other. Although specific size examples should not be considered to be limitations upon the scope of the invention, it is contemplated that the average size of the pore cells could be in the range of 450-800 µm across each pore cell and the density of the porous substrate material could be in the range of 300-600 g/m$^2$. In one example, the material has ligands that are less than approximately 8 micron in diameter. Thus, it is to be appreciated that the pores may be of a microscopic size range. Also, it is contemplated that the openness (i.e., open volume) of the pore cells is large. The amount of surface segments that define the pores within a cathode 50 is large. In one specific example, the total surface area of the surface segments that define the pores within a respective porous fin (e.g., 40A) is greater than the exterior surface area of a solid body of identical outer dimensions as the porous fin. As such, each porous fin (e.g., 40A) is an example of a high surface area structure that is inserted into the hollow member 22.

In the shown example of FIGS. 1 and 2, the interior surface 24 of the hollow member 22 is coated with neutron sensitive material. In accordance with an aspect of the invention, the surface segments (see 74 in FIG. 3) of the porous substrate material of the fins 40A-40H are coated with a layer of neutron sensitive material. As such, the inner surface of the hollow member 22 and the fins 40A-40H provide cathode 50 as a counterpart to the anode 30.

In one example, the neutron sensitive material on the cathode 50 (i.e., hollow member 22 and the fins 40A-40H) is boron that is enriched to have a high content of B-10. One example of a high content of B-10 is a content of B-10 greater than 90% boron. In one specific example, the process to coat the surface segments (see 74 in FIG. 3) of the porous substrate material of the fins is by exposure to boron gas. One example of such a gas is Borane. The coating layer upon the surface segments of the porous substrate material (see 70 in FIG. 3) of the fins is to be sufficiently thin so that the pores of the substrate material are not blocked or plugged. In other words, the pores remain open. The thickness could of course vary dependent upon pore size. The thickness of the coating layer on the interior surface of the hollow member may not be of the same thickness as that used for the porous material and one example coating is based upon 0.4 mg/cm$^2$ of a B-10.

It is the presence of the large amount of surface segments of the porous material (see 70 in FIG. 3) that are coated with the neutron sensitive material (e.g., boron) that provides at least one unique aspect of the invention. It is beneficial to have a large amount of coated surface area due to a propensity of the boron to be most effective for neutron capture at an outermost portion of a coating layer. A coating layer thickness needed for a substantial capture of neutrons exceeds the escape range of the neutron capture reaction products. So in many instances, capture reaction products cannot escape. Only conversions of neutrons in the outermost portion of a coating layer are associated with relatively high likelihood of escape of a reaction product from the boron coating layer. Thus, the presence of at least one fin of coated porous substrate as part of the cathode provides an improved likelihood of a neutron interaction within the detector due to an increased amount of coated surface area of the cathode.

Another example of material that may be used to provide the porous substrate material 70 (FIG. 3) is porous substrate foam that is intrinsically composed of boron-10 containing molecules, such as boron carbide. Such a boron-based substrate material would eliminate the need for a separate boron-coating step. The outermost layer of such boron-based foam inherently has an outermost layer that includes boron. Thus, the porous substrate and the layer of neutron sensitive material are integral and are a single material throughout. One example embodiment of such a foam is carbide foam with 1 to 3 percent relative density and approximately 100 pores per inch or greater. Another example embodiment is boron nitride. Within such example, ligands that are less than ~8 micron in diameter. Again, it is to be appreciated that the pores may be of a microscopic size range. The boron-based foam may be utilized in lieu of the non-boron-based substrate that would require a separate step of adding a separate boron layer.

At this point it would be useful to provide a basic operation of the electrode pair, anode 30 and cathode 50 (FIG. 1), for the purpose of neutron detection. The anode 30 and cathode 50 are separated from each other within the volume 26. The anode 30 and cathode are electrically connected to an associated electronics arrangement 60 (shown schematically within FIG. 1) as will be appreciated by the person of skill in the art. As mentioned, the cathode 50 includes the neutron sensitive material, B-10 boron. Sensing a neutron is accomplished by a current pulse that occurs between the anode 30 and cathode 50, through the gas, when a neutron impinges upon the B-10 boron of the cathode. The impingement may occur at either the coating layer on the interior surface of the hollow member or at one of the coated porous fins. As should be appreciated the presence of the porous fins 40A-40H provides increased opportunities for successful neutron interaction.

When a neutron is absorbed by a B-10 atom on the cathode 50, an alpha particle (i.e., a helium –4 nucleus) and lithium-7 nucleus, both positively charged, are generated and are ejected in opposite directions along a straight line, the orientation of which is random. One of these particles will not emerge from the B-10 layer because its direction of motion is not towards the cathode/gas interface. The other particle moves towards the cathode/gas interface from which it will emerge if it has enough energy. When one of these nuclear particles passes into the gas within the volume 26, the particle ionizes the gas. The negative ion particles, electrons, drift towards the anode 30 and as the negatively charged particles approach sufficiently near the anode (e.g., within 1-3 anode diameters) the negatively charged particles accelerate to the point of generating even more charge. This is called "gas gain" and it generates enough charge so that the resulting current has a perceptible effect within the associated electronics arrangement 60 operatively connected to the neutron detector 20. Thus, the current at the anode 30 is detectable and quantifiable. It is to be appreciated that in one example, the associated electronics arrangement 60 includes an electronic amplifier in order to aid in processing the current generated at the anode. The general operation/structure of neutron detectors and associated electronics arrangements will be appreciated by the person of skill in the art.

Focusing now upon insert (e.g., fin) configurations, any specific configuration of the example fin(s) need not be a limitation on the present invention. As such, details of some example embodiments are presented herein only to show some possibilities. It is to be understood that the breadth of the invention is to encompass other embodiments, variations, etc. As one specific example, of the breadth of the invention porous material may even be utilized on the inner surface of the hollow member 22.

The example of FIGS. 1 and 2 has been basically described, but the following provides some additional details. The porous fins 40A-4011 are attached to and electrically connected to the interior surface 24 of the hollow member 22. Each porous fin (e.g., 40A) is generally planar and each generally extends in a respective plane that is parallel to the axis 32. In the shown example, the planes intersect the axis 32. Each porous fin (e.g., 40A) extends the axial length of the hollow member 22, however each porous fin (e.g., 40A) extends only partially radially toward the axis 32 and the anode 30 located thereat. The eight porous fins 40A-40H are spaced at equidistant locations about the axis 32, and as such each fin is approximately 45° from each neighboring fin. Of course, the exact outer edge dimensioning with regard to the porous fins 40A-40H may be varied. With all of the surface segments of all of the porous fins 40A-40H coated with a layer of B-10, the amount of B-10 surface area within the sealed volume 26 increases greatly over merely the B-10 surface area of just the interior surface 24 of the hollow member 22.

Figure 4:
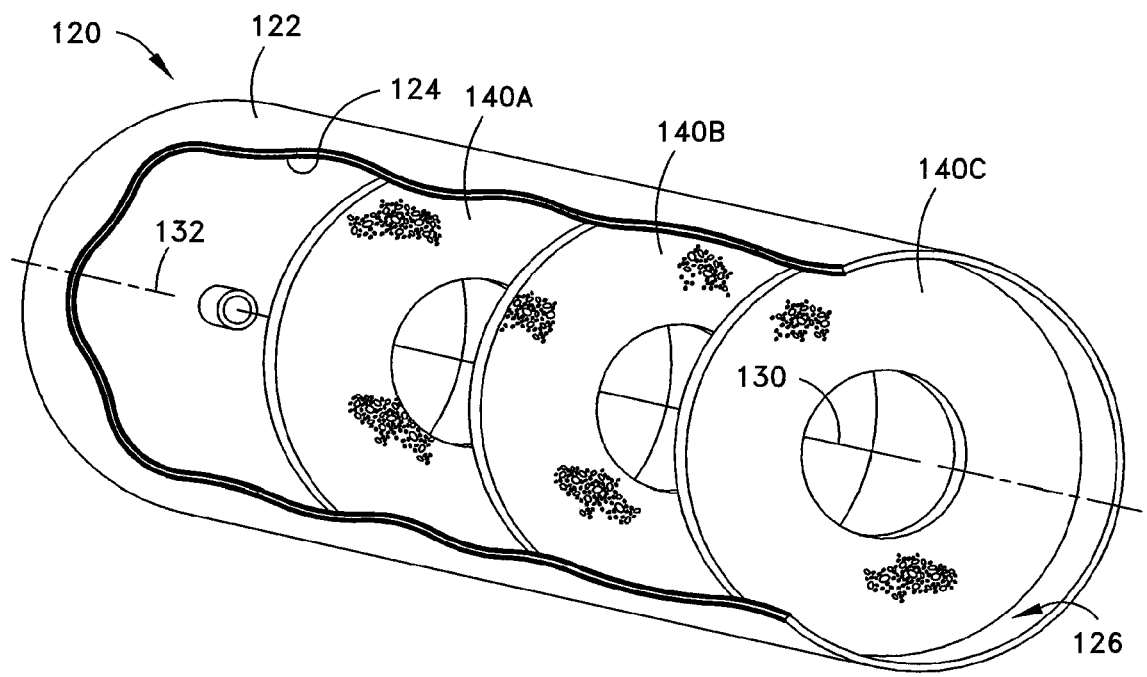
FIG. 4 is a perspective view, partially torn away, of another example neutron detector and showing at least one different type of fin that may use the example material of FIG. 3 in accordance with another aspect of the invention.

The example of FIG. 4 is a neutron detector 120 which is generally similar to the example of FIGS. 1 and 2 in that a hollow member 122 and an anode 130, located on an axis 132 of the hollow member, are present. Also, although not shown, suitable connections and electronics are provided. The example of FIG. 4 differs via the presence of different porous fins 140A-140C. Specifically, the porous fins 140A-140C of the FIG. 3 example are annular fins that are generally oriented in respective planes that are perpendicular to the axis 132. The porous fins 140A-140C are attached to and electrically connected to an interior surface 124 of the hollow member 122. Along any selected ray line direction, each fin (e.g. 140A) extends from the interior surface 124 of the hollow member 122 toward the axis 132. The porous fins 140A-140C terminate a distance from the axis 132. Three annular porous fins 140A-140C are shown in the example, however a different number of annular fins may be provided. The porous fins 140A-140C may be spaced at any desired axial distance. In one example the spacing between the porous fins 140A-140C is equidistant. Of course, the exact dimensioning with regard to the porous fins 140A-140C may be varied. With all of the surface segments of all of the porous fins 140A-140C coated with a layer of B-10, the amount of B-10 surface area within a sealed volume 126 within the hollow member 122 increases greatly over merely the B-10 surface area of just the interior surface 124 of the hollow member.

Figure 5:
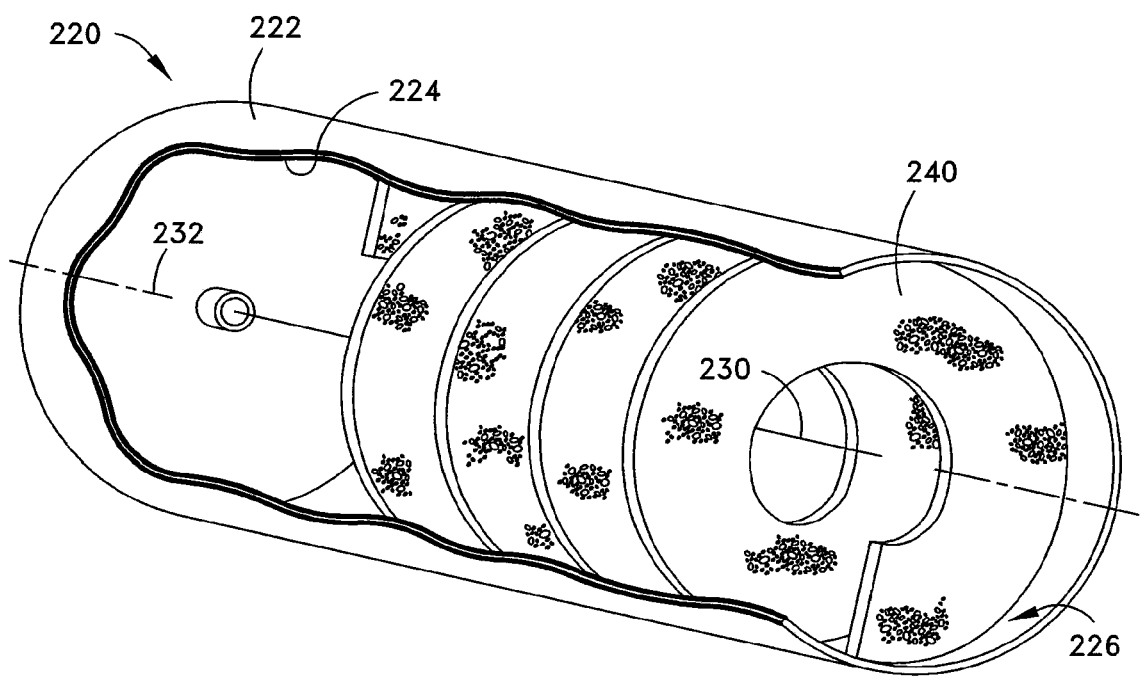
FIG. 5 is a perspective view, partially torn away, of still another example neutron detector and showing at least one still different type of fin that may use the example material of FIG. 3 in accordance with still another aspect of the invention.

The example of FIG. 5 is a neutron detector 220 which is generally similar to the previous examples (FIGS. 1 and 2, and FIG. 3) in that a hollow member 222 and an anode 230, on an axis 232 of the hollow member, are present. Also, although not shown, suitable connections and electronics are provided. The example of FIG. 5 differs via the presence of a different porous fin 240. Specifically, the porous fin 240 of the example is a single spiral fin. The fin 240 is attached to and electrically connected with the interior surface 224 of the hollow member 222. The fin porous 240 has a general helix form in that is extends around the axis 232 and also extends along the axial direction. Along any selected ray line direction, the porous fin 240 does extend from the interior surface 224 of the hollow member toward the axis 232. The porous fin 240 radially terminates a distance from the axis 232. The shown example has just one spiral porous fin 240, however a different number of porous fins may be provided. If multiple porous fins are present, each fin may be just a segment of a spiral or multiple spirals may be intertwined along the axial extend. The shown example spiral porous fin 240 has four turns to the spiral, but the number of turns of the spiral fin may differ. Also, the turns of the spiral porous fin 240 are spaced equidistant, but the spacing may be varied. With all of the surface segments of the spiral porous fin being coated with a layer of B-10, the amount of B-10 surface area within a sealed volume 226 of the hollow member 222 increases greatly over merely the B-10 surface area of just the interior surface 224 of the hollow member.

Figure 6:
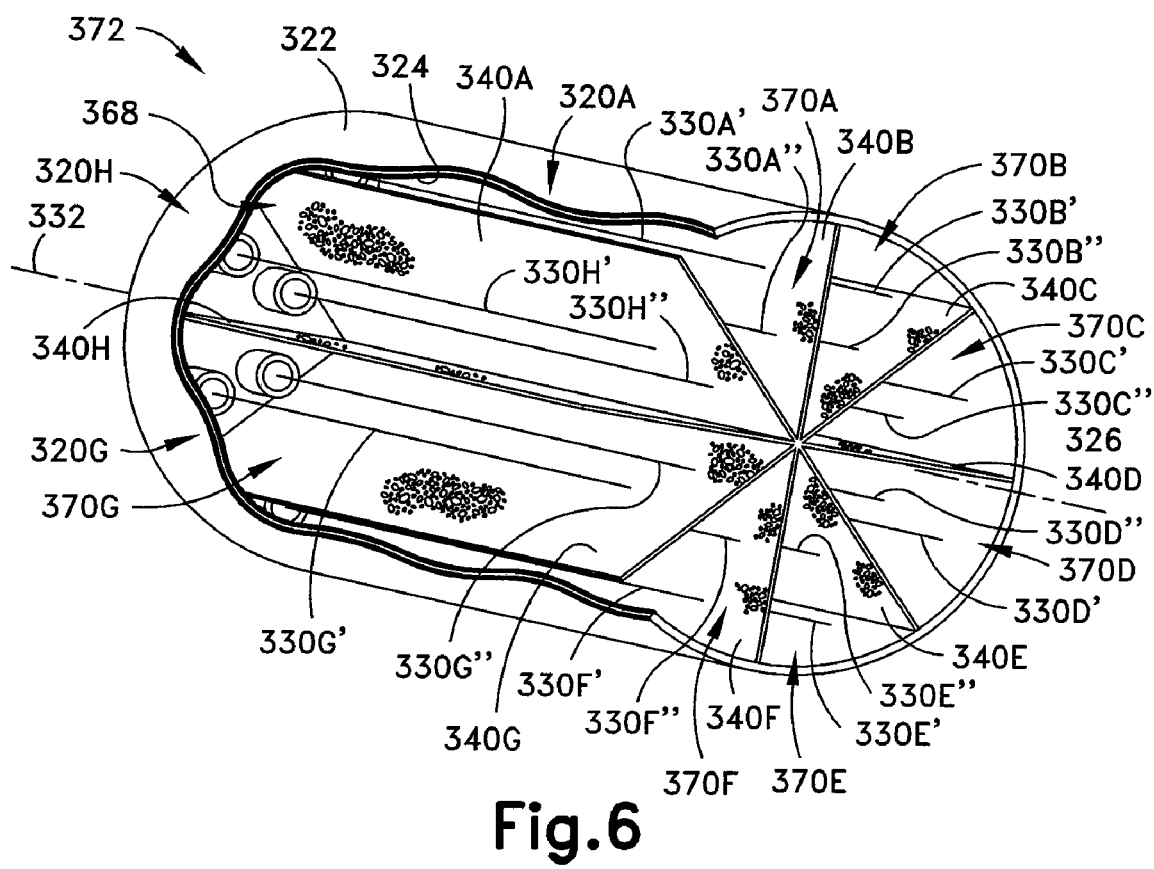
FIG. 6 is a perspective view, partially torn away, of an example of a neutron detector array and showing at least one different type of fin that may use the example material of FIG. 3 in accordance with yet another aspect of the invention.

FIG. 6 provides an example of the use of porous fins 340A-340H within a hollow member 322 that has some similarities, but a greater amount of dissimilarities to the previous examples. The example of FIG. 6 has the hollow member 322 and at least one anode (e.g., 330A'). Also, although not shown, suitable connections and electronics are provided. The example of FIG. 6 includes eight porous fins 340A-340H that are within a volume 326 of the hollow member 332, but the fins are connected to form a unitary divider 368 as an insert. With the fins being porous the divider is porous. Specifically, the fin divider 368 extends parallel to an axis 332 within the hollow member 22 to divide the volume 326 into a plurality (i.e., eight) of volume portions 370A-370H. In the shown example, the divider 368 is centered on the axis 332. As such the eight fins 340A-340H can be defined as spokes extending radially outward from the axis 332 to engage and electrically connect to the hollow member 322. The fins 340A-340H are evenly spaced about the axis (i.e., at 45° intervals). Thus, the volume portions 370A-370H are all the same (i.e., same shape and size). Each fin (e.g., 340A) is generally planar and each generally extends in a respective plane that is parallel to the axis 332. Specifically, the planes intersect the axis 332. In the shown example, each fin (e.g., 340A) extends the axial length of the hollow member 322. With all of the surface segments 342, 344 of all of the porous fins 340A-340H coated with a layer of B-10, the amount of B-10 surface area within the sealed volume 326 increases greatly over merely the B-10 surface area of just the interior surface 324 of the hollow member 322.

As mentioned, the example of FIG. 6 has at least one anode (e.g., 330A'). With the fin divider 368 being centered upon the axis 332, an anode is not located at the axis. Instead, plural anodes 330A'/330A"-330H'/330H" are provided and at least one anode (e.g., 330A') is located in each volume portion (e.g., 370A). In the shown example two anodes (e.g., 330A'/330A") are located in each volume portion (e.g., 370A), although the use of multiple anodes within each volume portion is not required.

With the separating porous fin divider 368 sufficiently coated with neutron sensitive B-10 material and with at least one anode (e.g., 330A') within each volume portion (e.g., 370A), each volume portion defines an individual neutron detector (e.g., 320A). Thus, the example of FIG. 5 is operable as a neutron detector array 372. Another way of considering the example of FIG. 5 is that with all of the surface segments of the porous fins 340A-340H being coated with a layer of B-10, the amount of B-10 surface area within the sealed volume 326 there is a sufficient increase over merely the B-10 surface area of just the interior surface 324 of the hollow member 322 to utilize the hollow member as part of an neutron detector array 372 as opposed to use as part of just a single detector.

The invention has been described with reference to the example embodiments described above. Modifications and alterations will occur to others upon a reading and understanding of this specification. Example embodiments incorporating one or more aspects of the invention are intended to include all such modifications and alterations insofar as they come within the scope of the appended claims.

The invention claimed is:

1. A neutron detector including:
   an anode; and
   a cathode, the cathode including at least one portion that has a porous substrate with surface segments that define open pores and a layer of neutron sensitive material on the surface segments of the porous substrate;
   wherein the at least one portion includes at least one extending fin.

2. A neutron detector as set forth in claim 1, wherein a portion of the cathode is located on an interior surface of a hollow member, the at least one fin extends from the interior surface of the hollow member.

3. A neutron detector as set forth in claim 2, wherein the hollow member has a cylindrical shape that circumscribes an axis and the anode is located on the axis.

4. A neutron detector as set forth in claim 3, wherein the at least one fin extends radially inward from the interior surface of the hollow member.

5. A neutron detector as set forth in claim 3, wherein the at least one fin is planar and extends in a plane parallel to the axis.

6. A neutron detector as set forth in claim 3, wherein the at least one fin is planar and extends in a plane perpendicular to the axis.

7. A neutron detector as set forth in claim 3, wherein the at least one fin is spiral to extend along an axial extent.

8. A neutron detector as set forth in claim 3, wherein the at least one fin is annular and extends about the axis.

9. A neutron detector as set forth in claim 2, wherein the hollow member circumscribes an axis and the at least one fin extends to the axis.

10. A neutron detector as set forth in claim 9, wherein the at least one fin is part of a multi-fin divider centered on the axis.

11. A neutron detector including:
    an anode; and
    a cathode, the cathode including at least one portion that has a porous substrate with surface segments that define open pores and a layer of neutron sensitive material on the surface segments of the porous substrate;
    wherein the detector is part of a detector array within a hollow member, the array having a plurality of anodes extending within the volume of the hollow member and the at least one portion includes at least one fin extending from the interior surface of the hollow member.

12. A neutron detector as set forth in claim 11, wherein the hollow member is centered on an axis and the at least one fin is part of a multi-fin divider centered on the axis.

13. A neutron detector as set forth in claim 12, wherein the multi-fin divider divides the volume of the hollow member into a plurality of volume portions each with at least one of the anodes located therein.

* * * * *

UNITED STATES PATENT AND TRADEMARK OFFICE
CERTIFICATE OF CORRECTION

PATENT NO. : 8,129,690 B2  
APPLICATION NO. : 12/422777  
DATED : March 6, 2012  
INVENTOR(S) : McCormick et al.

Page 1 of 1

It is certified that error appears in the above-identified patent and that said Letters Patent is hereby corrected as shown below:

Column 1, line 50, please delete "4011" and insert therefor --40H--.

Signed and Sealed this  
Twenty-ninth Day of May, 2012

David J. Kappos  
*Director of the United States Patent and Trademark Office*